US006816964B1

United States Patent
Suzuki et al.

(10) Patent No.: US 6,816,964 B1
(45) Date of Patent: Nov. 9, 2004

(54) SYSTEM, METHOD AND MEDIUM STORING A PROGRAM CONTROLLING A COMPUTER, TO INSTALL A PROGRAM REMOTELY AND AUTOMATICALLY INTO A CLIENT BY PRE-DOWNLOADED AGENT USING MANAGING RECORD RECORDING AN INSTALL EXECUTION STATE OF THE CLIENT AND EXECUTION CONTROL INFORMATION

(75) Inventors: Masanori Suzuki, Kawasaki (JP); Akikazu Seki, Nagano (JP); Katsuya Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/523,680

(22) Filed: Mar. 10, 2000

(30) Foreign Application Priority Data

Jul. 26, 1999 (JP) .......................................... 11-210078

(51) Int. Cl.[7] .............................................. G06F 9/445
(52) U.S. Cl. .................... 713/2; 713/1; 713/2; 709/232
(58) Field of Search ........................ 713/2, 1; 709/232

(56) References Cited

U.S. PATENT DOCUMENTS

| | | | | |
|---|---|---|---|---|
| 5,797,016 A | * | 8/1998 | Chen et al. ................. 395/712 |
| 5,805,897 A | * | 9/1998 | Glowny ...................... 717/178 |
| 5,978,594 A | * | 11/1999 | Bonnell et al. ............... 710/17 |
| 6,009,274 A | * | 12/1999 | Fletcher et al. .............. 395/712 |
| 6,038,664 A | * | 3/2000 | Schumacher et al. .......... 713/2 |
| 6,049,892 A | * | 4/2000 | Casagrande et al. .......... 714/18 |
| 6,052,779 A | * | 4/2000 | Jackson et al. ................ 713/2 |
| 6,067,582 A | * | 5/2000 | Smith et al. ................... 710/5 |
| 6,075,943 A | * | 6/2000 | Feinman ...................... 395/712 |
| 6,240,550 B1 | * | 5/2001 | Nathan et al. ................. 717/11 |
| 6,247,126 B1 | * | 6/2001 | Beelitz et al. ................. 713/1 |
| 6,282,711 B1 | * | 8/2001 | Halpern et al. ............... 717/175 |
| 6,363,499 B1 | * | 3/2002 | Delo et al. ..................... 714/15 |
| 6,421,777 B1 | * | 7/2002 | Pierre-Louis et al. .......... 713/2 |
| 6,526,447 B1 | * | 2/2003 | Giammaria ................... 709/232 |
| 2001/0042112 A1 | * | 11/2001 | Slivka et al. ................. 709/220 |

FOREIGN PATENT DOCUMENTS

| | | |
|---|---|---|
| JP | 6-89181 | 3/1994 |
| JP | 8-263409 | 10/1996 |
| JP | 10-133881 | 5/1998 |
| JP | 10-171635 | 6/1998 |

OTHER PUBLICATIONS

RD 349094 A, May 1993, RD, Anon.*
IBM TDB, Mar. 1992, US vol. 34, issue 10A, p. 9.*

* cited by examiner

Primary Examiner—Dennis M. Butler
Assistant Examiner—Nitin C. Patel
(74) Attorney, Agent, or Firm—Staas & Halsey LLP

(57) ABSTRACT

An agent is downloaded from a server to a client before installation. Then, the agent executes installation of an install file into the client by referring to a managing record file and according to an execution script. The agent updates the managing record file according to an install execution state of the client. When downloaded again from the server to the client after reboot, the agent continues the installation of the install file by referring to the managing record file and according to the execution script, and further updates the managing record file according to an install execution state of the client.

18 Claims, 5 Drawing Sheets

SYSTEM, METHOD AND MEDIUM STORING A PROGRAM CONTROLLING A COMPUTER, TO INSTALL A PROGRAM REMOTELY AND AUTOMATICALLY INTO A CLIENT BY PRE-DOWNLOADED AGENT USING MANAGING RECORD RECORDING AN INSTALL EXECUTION STATE OF THE CLIENT AND EXECUTION CONTROL INFORMATION

BACKGROUND OF THE INVENTION

1. Field of the Invention

The present invention relates to a remote loading execution method, a remote loading execution system, a data processing apparatus, a managing apparatus and a computer-readable recording medium for easily and safely constructing a client environment in a client/server configuration.

2. Description of the Related Art

Construction of an environment at a client, in the form of a personal computer or the like, is carried out by installing programs one by one in a stand-alone state, or by selecting programs one by one from a server and installing them.

Recently, there have been available a structure wherein a client is turned on by a command from a server, for example, WoL (Wake On LAN) wherein a remote client is turned on by sending a packet thereto, and a structure wherein a client requests connection to a server immediately upon turning-on of the client, for example, PXE (Preboot execution Environment) wherein a client requests connection to a server before an operating system is booted in the client in the server/client environment (in this case, however, a network adapter of the client requires a dedicated ROM).

By utilizing the foregoing WoL and PXE, a single program can be installed by remote loading without any operation at a side of a client.

However, when installing a program which requires a reboot during installation (including a case of installing a plurality of programs), a manual operation by a user is required at a side of a client after the reboot. Thus, even if the foregoing structures are used, it is impossible to accomplish the remote loading.

Further, during the user's manual operation, it may happen that an install log obtained up to then in the client is lost due to a reboot, resulting in an endless loop of repeating an install operation from the beginning after the reboot. In that event, the user should carry out an operation for stopping it, which, however, is difficult for a person having no technical knowledge about it.

Accordingly, the requirement of the manual operation on the client side imposes a burden on a user having no relevant technical knowledge or experience. This lowers the merit of the service, and further, may require dispatch of a skilled person thereby to induce labor and cost. Further, since the install state of the client can not be known, the reliability of the client environment construction in the client/server configuration may also be lowered. Particularly, the remote loading operation of this type may be required when the client is down to require recovery. Thus, it is desired that the recovery can be achieved fully automatically through an operation from the server.

SUMMARY OF THE INVENTION

Therefore, it is an object of the present invention to provide an improved program install technique. More specifically, the present invention aims to provide a remote loading execution method and a remote loading execution system, wherein all operation environment of a client is provided in a server so that even if there exists such a program requiring a reboot upon installation thereof, the program can be automatically installed into the client by a command from the server, thereby to ensure construction of a client environment in a client/server configuration. The present invention also aims to provide a data processing apparatus as the client and a managing apparatus as the server, and further provide a computer-readable recording medium for realizing the foregoing client or server using a computer.

According to one aspect of the present invention, there is provided a remote loading execution method, wherein an agent executes installation into a client by referring to a managing record recording an install execution state of the client and according to execution control information, the agent downloaded into the client before starting the installation or after a reboot.

According to this structure, the agent implements the installation into the client by referring to the managing record of the install execution state of the client and according to the execution control information. After the reboot, the agent is again downloaded into the client so as to continue the installation into the client by referring to the managing record including a reboot log and according to a continuation of the execution control information to be executed after the reboot. Therefore, even if a reboot is requested, the installation can be continued without the need for a manual operation on the side of the client.

The agent is an independent program for executing a process on the side of a particular apparatus into which the agent is downloaded, according to execution commands prescribed in the execution control information. In this structure, the agent executes installation of various kinds of programs into the client.

The execution control information is definition information, such as an execution script, setting execution commands (setup commands) necessary for performing installation into the client, which is read and executed by the agent on the side of the client. When the agent executes installation according to the execution control information, a program (including an operating system) to be installed into the client should be provided on the side of the server. The installation of the program includes a case wherein an install image file of the program is provided in advance on the side of the server and then copied into the client by downloading.

In the foregoing structure, it is necessary that the managing record be updated according to the install execution state while the agent executes the installation into the client. Without such updating, since the agent once stops execution of the installation according to the execution control information when a reboot is requested, the agent, after the reboot, refers to a record before the reboot (a record not updated) so as to start again the installation returning to the beginning of the execution control information, thus resulting in an endless loop.

Through updating of the managing record, the server can know the progressing state of the installation into the client. Thus, the server can execute the centralized management so that install errors and troubles can be properly dealt with to provide highly reliable environments.

According to another aspect of the present invention, there is provided a remote loading execution method, wherein, upon installing a program requiring a reboot from a server into a client, an agent downloaded into the client executes installation of the program by referring to a managing record recording an install execution state of the client and according to execution control information and updates the managing record according to an execution state of the installation, and wherein the agent downloaded again into the client after the reboot continues the installation by referring to the managing record and according to the execution control information and updates the managing record according to an execution state of the installation after the reboot.

Through the updating, a log of the install execution state before the reboot remains in the managing record. Accordingly, the agent downloaded again into the client after the reboot can continue the installation into the client by referring to the updated managing record and according to a continuation of the execution control information to be executed after the reboot. When a further reboot is requested (one program may require a plurality of reboots, or a plurality of reboots are requested during continuous installation of a plurality of programs), the managing record is further updated according to an install execution state after the reboot, in addition to continuing the installation.

The execution control information may be provided on the side of the server. In this case, upon executing installation (including a case of installation after a reboot), the agent accesses the server to refer to the execution control information and executes the installation according to it. An advantage of this structure resides in that even if failure occurs in the client during installation, the execution control information is prevented from being lost or altered, thereby avoiding an influence of failure of the client onto the server.

The execution control information may be provided in the server and downloaded into the client before starting the installation or after the reboot. In this case, the agent can execute the installation according to the execution control information provided in the client. Accordingly, since the agent can refer to the execution control information without accessing the server, the install operation efficiency can be enhanced.

The managing record recording the install execution state of the client may be provided in the server and updated according to the install execution state of the client. In this case, the agent accesses the server so as to update the managing record just before starting installation, during installation or per completion of installation. An advantage of this structure resides in that even if failure occurs in the client during the installation, a managing record thereof remains in the server so that when restarting the installation afterward, the installation can be implemented safely.

It may be arranged that the managing record is provided in the server, downloaded into the client, updated in the client according to the install execution state of the client, returned to the server before the reboot, downloaded again into the client after the reboot, and then updated in the client according to the install execution state of the client after the reboot. Since the updated managing record is once returned to the server before the reboot and downloaded again into the client after the reboot and since the agent refers to such an updated managing record to continue the installation, the installation can be executed according to a continuation of the execution control information to be executed after the reboot.

When a reboot is requested during the installation in the client, booting by the client itself is necessary. Thus, if the client has been booted by the server (in case of remote boot), setting should be changed to allow the booting by the client itself (allow a local boot). The change of the setting to the local boot is implemented on the side of the server.

According to another aspect of the present invention, there is provided a remote loading execution system comprising a server having a managing record file for recording an install execution state of a client, a control file for storing execution control information prescribing an execution process of installation into the client, an agent which executes installation into the client according to the execution control information stored in the control file, and an install file to be installed into the client by the agent; and the client into which the agent is downloaded, wherein the agent is downloaded from the server into the client before installation, executes installation of the install file into the client by referring to the managing record file and according to the execution control information, updates the managing record file according to an execution state of the installation into the client and, when downloaded again into the client after a reboot, continues the installation of the install file by referring to the managing record file and according to the execution control information, and updates the managing record file according to an execution state of the installation after the reboot.

The install file represents a file of a program or a group of programs to be installed into the client, and may be a file of an operating system or application programs. The install file may be in the form of an image file which is provided in advance in the server and then copied into the client by downloading.

It may be arranged that the control file is provided in the server.

It may be arranged that the control file is downloaded into the client before starting the installation or after the reboot.

It may be arranged that the managing record file is downloaded from the server into the client and updated according to an execution state of the installation into the client, and that the managing record file is returned to the server before the reboot, downloaded again into the client after the reboot, and updated according to an execution state of the installation into the client after the reboot.

It may be arranged that the client is set to boot by itself upon the reboot.

According to another aspect of the present invention, there is provided a data processing apparatus which accesses another apparatus managing a program thereby to install the program thereinto, the data processing apparatus comprising an access processing section for accessing execution control information prescribing an install execution procedure; a record control section for causing an execution state of installation Into the data processing apparatus to be recorded; and an install executing section for executing installation into the data processing apparatus according to the recorded execution state of the installation and the execution control information.

According to this structure, the access processing section accesses the execution control information, the install executing section executes installation of the program according to the execution control information and the install execution state recorded by the record control section, and the record control section updates the record according to the install execution state. Since the record is updated by the record control section and since the install executing section executes installation according to the updated record, even when installing a program requiring a reboot, the installation can be continued after the reboot. Thus, it is possible to access another apparatus and automatically install such a program into the data processing apparatus.

According to another aspect of the present invention, there is provided a managing apparatus which manages a program and supplies the program in response to a request from another apparatus, the managing apparatus comprising a transmit section for transmitting to the another apparatus an agent which executes installation into the another apparatus; a control information managing section for allowing the agent to refer to execution control information prescribing an install execution process in response to an access from the agent; a record managing section for notifying an execution state of installation into the another apparatus and updating a record of the execution state of the installation in response to an access from the agent; and a supply section for supplying to the another apparatus the program in response to a request from the agent.

According to this structure, the transmit section sends the agent to another apparatus, and the supply section sends the program to the agent in response to a request from the agent functioning in another apparatus, so that the agent refers to the execution control information managed by the control information managing section and the install execution state recorded by the record managing section thereby to execute the installation into another apparatus. In this case, since the record managing section updates the record of the install execution state according to the execution state of the installation into another apparatus and since the agent implements the installation by referring to the record, even when installing a program requiring a reboot, the agent can continue the installation after the reboot.

According to another aspect of the present invention, there is provided a computer-readable recording medium storing a program which causes a computer to execute a step of referring to execution control information prescribing an install execution process; a step of recording an install execution state; and a step of requesting to another apparatus a supply of a program to be installed and executing installation thereof according to the execution control information and the install execution state.

According to this structure, an agent functions by causing the computer to read and execute the program recorded in the recording medium. By referring to the execution control information and the install execution state, the agent requests a supply of a program to another apparatus and executes installation of the supplied program. In this event, since the agent causes the record of the install execution state to be updated and executes the installation by referring to it, even when installing such a program requiring a reboot, the agent can continue the installation after the reboot.

According to another aspect of the present invention, there is provided a computer-readable recording medium storing a program which causes a computer to execute a step of sending to another apparatus an agent which executes installation into the another apparatus; a step of allowing the agent to refer to execution control information in response to an access from the agent; a step of notifying an execution state of installation into the another apparatus and updating a record of the execution state of the installation in response to an access from the agent; and a step of supplying to the another apparatus a program requested by the agent.

According to this structure, the computer functions as a server by causing the computer to read and execute the program recorded in the recording medium. In this case, the computer sends the agent to another apparatus, sends a program to the agent in response to a request from the agent functioning in another apparatus, and causes the agent to refer to the execution control information and the record of the install execution state thereby to execute installation of the program in another apparatus. In this event, since the agent causes the record of the install execution state to be updated and executes the installation by referring to it, even when installing such a program requiring a reboot, the agent can continue the installation after the reboot.

BRIEF DESCRIPTION OF THE DRAWINGS

The present invention will be understood more fully from the detailed description given hereinbelow, taken in conjunction with the accompanying drawings.

In the drawing.

DESCRIPTION OF THE PREFERRED EMBODIMENT

Now, a preferred embodiment of the present invention will be described hereinbelow with reference to the accompanying drawings.

Figure 1:
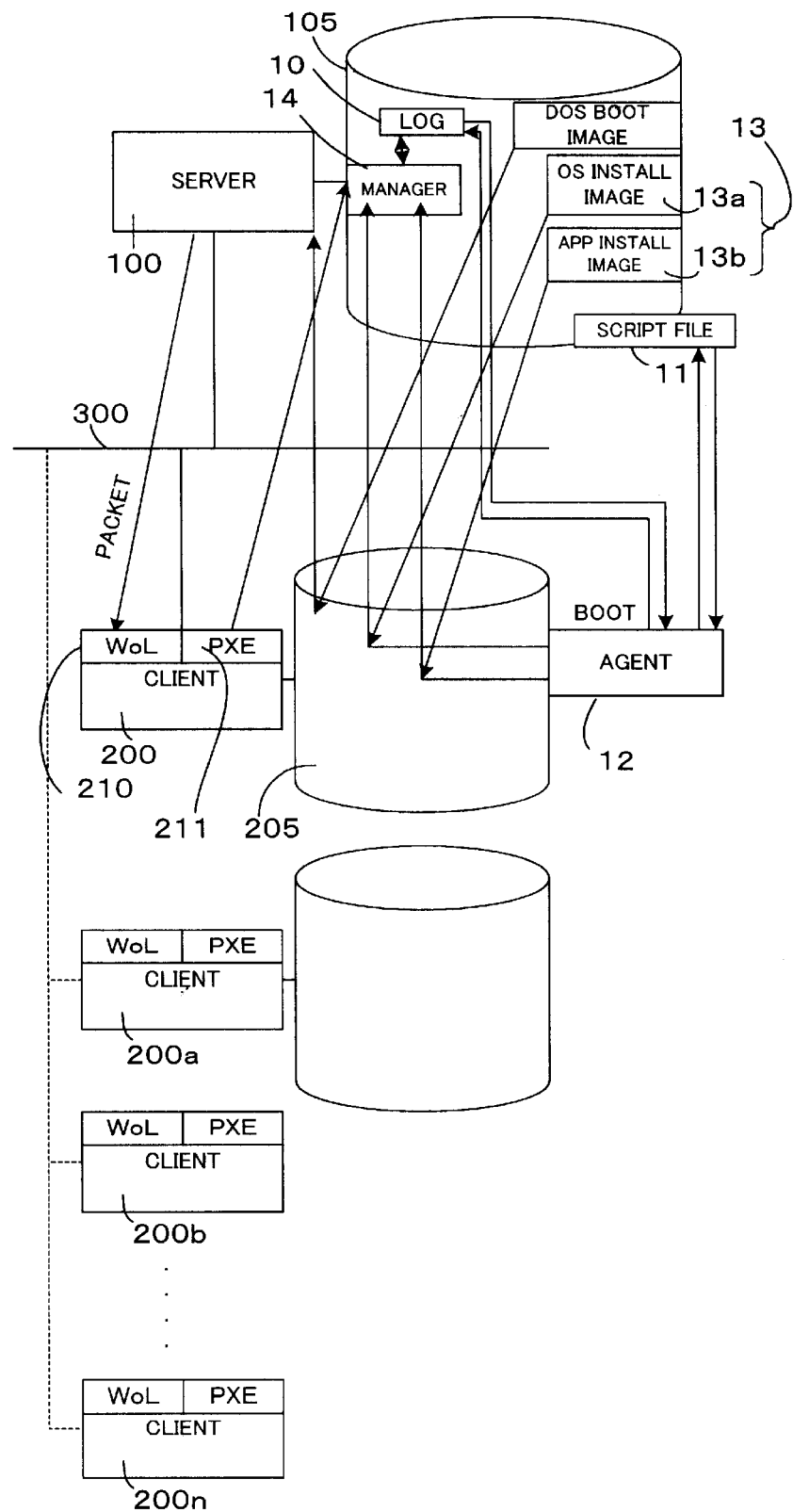
FIG. 1 is a diagram schematically showing a structure of a remote loading execution system including a server and clients, according to preferred embodiment of the present invention.

FIG. 1 shows a server (managing apparatus) 100 and clients (data processing apparatuses) 200a, 200b, . . . , 200n which are connected via a local area network (LAN) 300 to construct a remote loading execution system according to this embodiment. For brevity of description, a client 200 is used for representing all the clients 200a to 200n.

Figure 2:
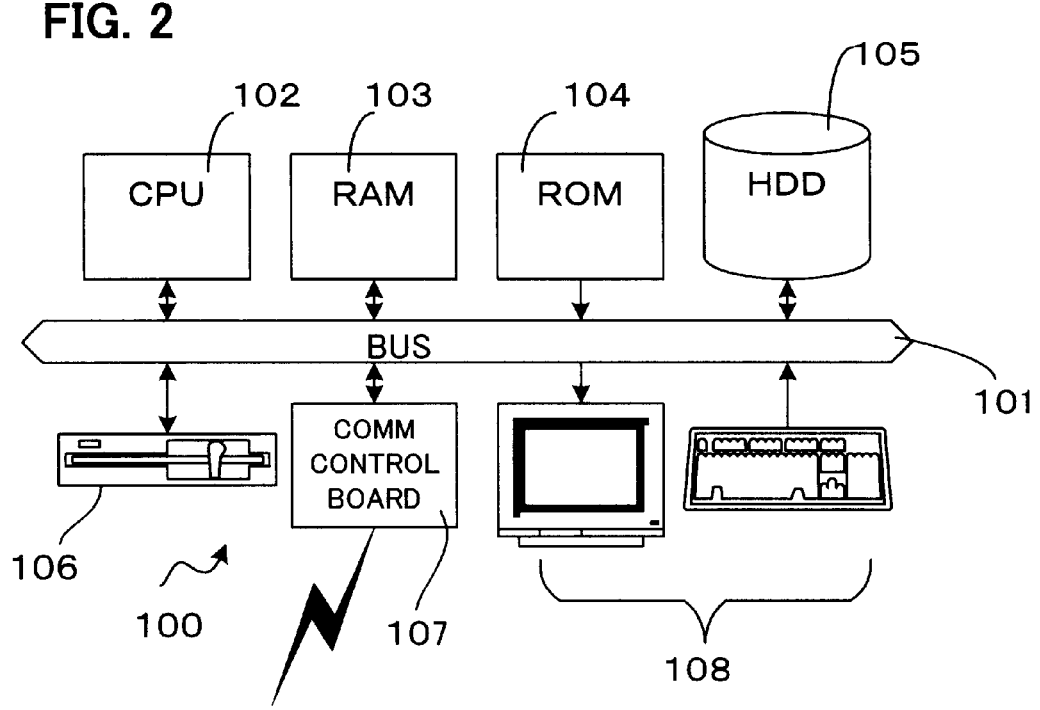
FIG. 2 is a diagram for explaining a hardware configuration of the server.

As shown in FIG. 2, the server 100 comprises a CPU 102, a RAM 103, a ROM 104, a HDD (hard disk drive) 105, a FDD (floppy disk drive) 106, a communication control board 107 providing a LAN communication environment, and input/output devices 108 such as a display unit and a keyboard, which are connected via a bus 101.

The HDD 105 stores therein, as shown in FIG. 1, a managing record file (log file) 10 for recording an execution state of installation into the client 200, a script file 11, i.e. a control file, storing therein an execution script S, i.e. execution control information, which prescribes an execution process of installation into the client 200, an agent 12 for executing installation into the client 200 according to the execution script S stored in the script file 11, and install files 13 to be installed into the client 200.

The execution script S is definition information setting execution commands (setup commands) necessary for installation into the client 200, which is read and executed by the agent 12 in the client 200. The execution script S sets the setup commands in order of the install files 13 to be set up.

The agent 12 is an independent program for executing processes according to the execution commands prescribed in the execution script S at a destination into which it is downloaded. In this embodiment, the agent 12 installs the install files 13 into the client 200. The agent 12 accesses the managing record file 10 to confirm an install progressing state of the client 200 before installation and then executes the installation according to the execution script S. Every time the installation is finished or a reboot is demanded, the agent 12 accesses the managing record file 10 to update the install progressing state.

The install files 13 include a DOS boot image file (including a later-described DOS and LAN manager) to be first booted in the client 200, an OS install image file 13*a* of an operating system to be booted in the client 200, and an application install image file 13*b* of an application to be installed into the client 200. These files are provided in the system for booting the client 200 or executing recovery after shut down of the client 200.

The server 100 is further provided with a program which is read from the HDD 105 and executed by the CPU 102. This program includes a manager 14 for managing reading and writing (including updating) of the managing record file 10 and reading of the script file 11.

The manager 14 has a function of producing a command for switching from remote boot execution by means of PXE in the client 200 to local boot execution (booting by client singly), in response to a request sent from the agent 12 according to description of the execution script S when the installation into the client 200 is executed so that a reboot request is made (to be exact, when the managing record file 10 is updated in response to a reboot request). Upon such switching, setting of a boot flag provided in the managing record file 10 corresponding to each of the clients 200*a* to 200*n* is implemented, wherein the boot flag is set to 1 in case of the local boot and 0 in case of the remote boot).

Figure 3:
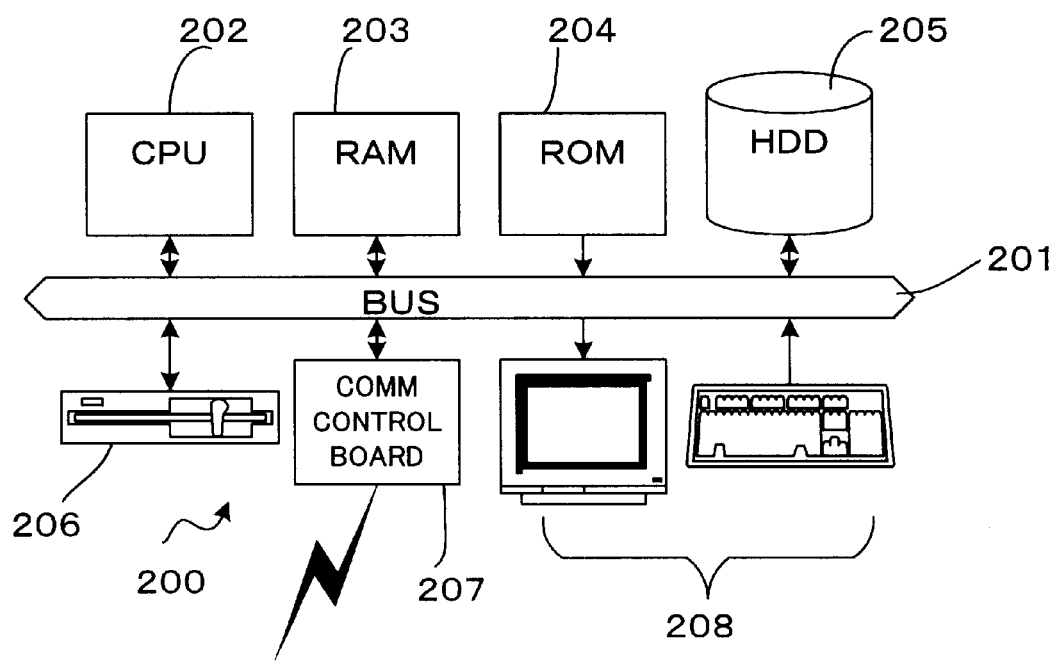
FIG. 3 is a diagram for explaining a hardware configuration of the client.

As shown in FIG. 3, the client 200 has approximately the same configuration as the server 100. The client 200 comprises a CPU 202, a RAM 203, a ROM 204, a HDD (hard disk drive) 205, a FDD (floppy disk drive) 206, a communication control board 207 providing a LAN communication environment, and input/output devices 208 such as a display unit and a keyboard, which are connected via a bus 201.

The client 200 is provided, as shown in FIG. 1, with Wake On LAN (WoL) 210 and PXE (Preboot eXecution Environment) 211 which are realized by a ROM (not shown) mounted on the communication control board 207 (FIG. 3). Depending on setting of a BIOS of the client 200, the ROM on the communication control board 207 is determined whether to realize the foregoing WoL 210 and PXE 211, which is stored in a flash memory (not shown) on the communication control board 207 or the like.

The WoL 210 has a function of turning on the client 200 in response to a packet sent from the server 100 to the client 200.

According to the PXE 211, the client 200 requests connection to the server 100 immediately upon turning-on of the client 200. At this moment, if the boot flag of the client 200 in the managing record file 10 is set to 0 (remote boot: the boot flag is set to 0 as a default), the DOS boot image file is first sent from the server 100 so that the client 200 is started up in the DOS (Disk Operating System) environment. Further, since the client 200 is connected to the server 100 by means of the LAN manager in the DOS environment, the agent 12 is sent from the server 100 to be loaded into the RAM 203 of the client 200. Even when an operating system is bootable in the client 200, if the PXE 211 becomes effective immediately upon turning-on of the client 200, the client 200 is booted by the server 100 before the operating system in the client 200 is booted.

Referring to FIG. 1 and further to FIGS. 4 and 5, the processing between the server 100 and the client 200 will be described.

Figure 4:
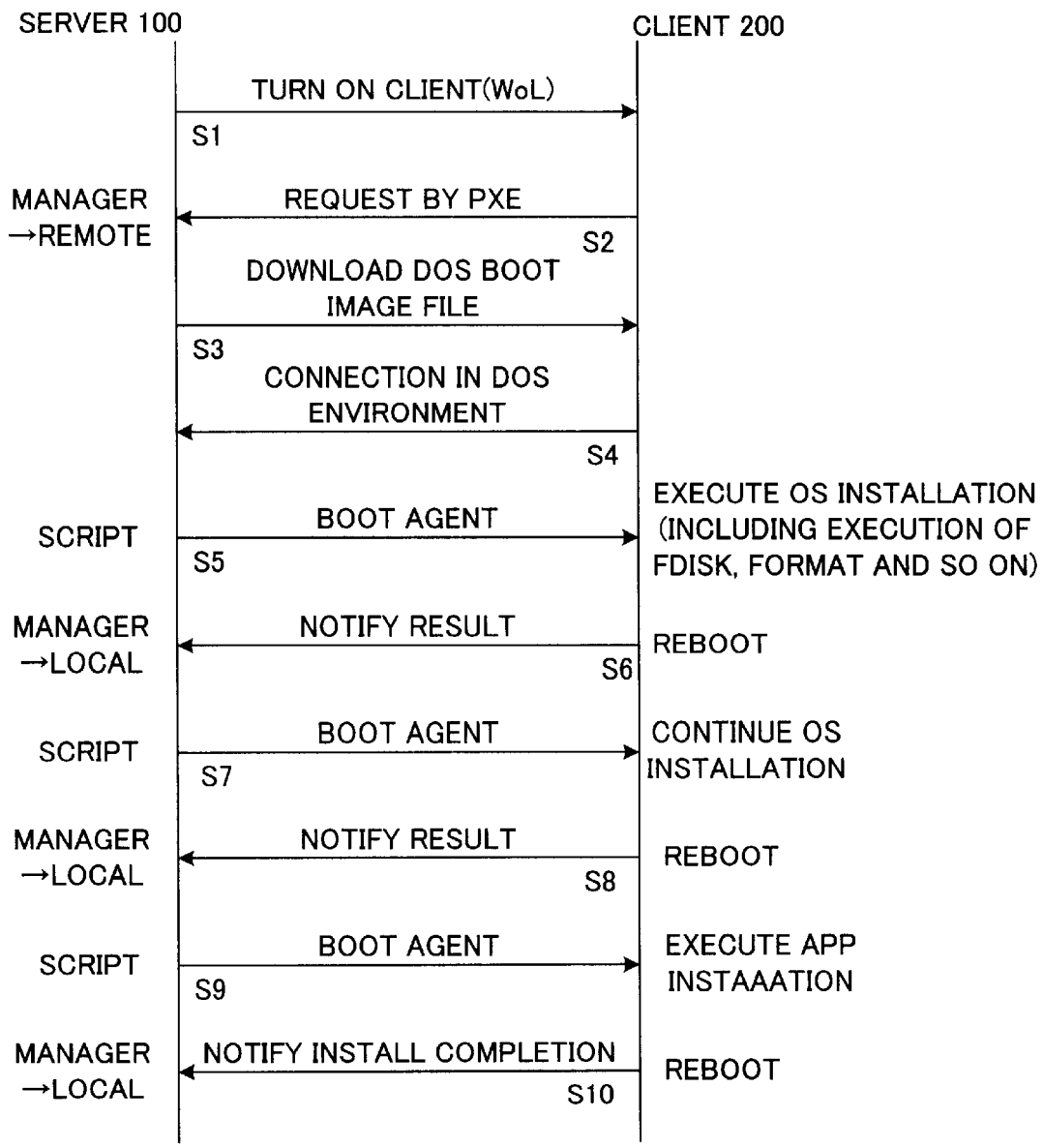
FIG. 4 is a diagram showing a sequence of procedure between the server and the client.

(1) As shown in FIGS. 1 and 4, the server 100 first sends a packet to the client 200 so that the WoL 210 turns on the client 200 (step S1).

(2) Immediately upon turning-on of the client 200, the PXE 211 is booted so that a request of the PXE 211 is sent to the server 100 and received by the manager 14 (step S2).

(3) As a default, the boot flag of the client 200 is set to 0 (remote boot) in the managing record file 10. Thus, the manager 14 causes the DOS boot image file to be downloaded from the server 100 into the RAM 203 of the client 200 (step S3). At this moment, the LAN manager is also downloaded into the client 200 to be booted together with the DOS.

(4) By means of the LAN manager, the client 200 is connected to the server 100 in the DOS environment (the processing up to here is the remote boot processing by the PXE 211). Simultaneously, the agent 12 is downloaded from the server 100 into the RAM 203 of the client 200 (step S4).

Figure 5:
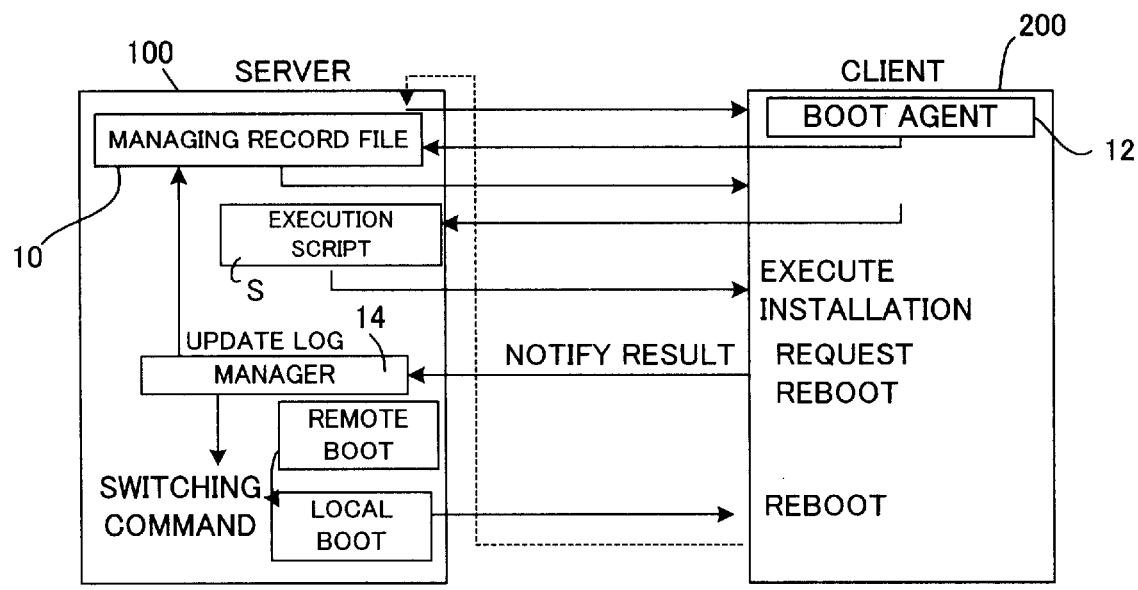
FIG. 5 is a diagram for explaining the main part of the procedural sequence shown in FIG. 4.

(5) As shown in FIG. 5, after booting, the agent 12 first accesses the managing record file 10 in the server 100. At this time point, nothing is recorded about the install execution state of the client 200. Then, the agent 12 accesses the script file 11 in the server 100 and executes the setup commands of the operating system install set in the first place of the execution script S. In this event, Fdisk, Format and other commands in the install files 13 for initializing the HDD 205 are first executed and then the commands of the script (the setup commands of the operating system such as WINDOWS) are executed in the DOS environment so that the OS install image file 13*a* is installed into the HDD 205 of the client 200 (step S5).

(6) A reboot is requested during installation of the operating system. The agent 12 notifies the install execution state up to then to the manager 14 in the server 100. In response to this notification, the manager 14 records it into the managing record file 10 for updating. Simultaneously, the manager 14 sets the boot flag of the client 200 to 1 (local boot) for switching from the remote boot to the local boot (step S6).

(7) Based on the switching, the reboot is executed by the local boot in the client 200. At this moment, the agent 12 is again downloaded into the client 200 and booted again after the reboot. The agent 12 accesses again the managing record file 10 to detect the progressing state of installation in the client 200 and executes a continuation of the execution script S based on the detected progressing state to continue the installation (step S7).

(8) The installation of the operating system into the client 200 is finished and a reboot is requested again. At this moment, the agent 12 notifies the manager 14 that the operating system has been installed. In response to this notification, the manager 14 records the completion of OS installation in the managing record file 10 to update it (step S8).

(9) After the reboot, the agent 12 is again downloaded into the client 200 and booted. The agent 12 accesses again the managing record file 10 to detect the progressing state of installation in the client 200. Based on the detected progressing state, the agent 12 executes installation of the application install image file 13*b* as prescribed in a continuation of the execution script S (step S9). When installing a plurality of application install image files 13b, a reboot is requested between installation of one and that of another. In this case, as in the foregoing processing, the agent 12 is booted in the client 200, accesses the managing record file 10 and follows the execution script S of the script file 11, thereby to install those application install image files 13b.

(10) Upon completion of all the application install image files 13b, a reboot is requested. Then, the agent 12 notifies the server 100 that all the installation has been finished. The manager 14 in the server 100 receives this notification and finishes the service (step S10).

Through the foregoing processing implemented between the server 100 and the client 200, even the operation system and the application programs requiring a reboot upon installation can be automatically installed by the command from the server 100, so that the environment of the client 200 in the client/server configuration can be constructed. Accordingly, in addition to booting the client 200 from the beginning, the recovery can be automatically achieved through an operation from the server 100 when the client 200 gets down. Particularly, even when a user has no technical knowledge, since a manual operation on the side of the client 200 is not required, improvement in service can be expected to eliminate the necessity of dispatch of a skilled person and facilitate the management. Further, since the server 100 can catch the install execution state of the client 200, the reliability is also improved relative to the construction of the client environment in the client/server configuration.

In this embodiment, the script file 11 is always provided on the side of the server 100. However, it may be arranged that the script file 11 is downloaded into the client 200 before installation or after reboot so that the agent 12 executes installation according to the execution script S provided in the client 200. In this case, since the agent 12 can refer to the execution script S without accessing the server 100, the operation efficiency of installation can be heightened.

In this embodiment, the managing record file 10 is provided on the side of the server 100. However, the managing record file 10 may be downloaded from the server 100 into the client 200, updated in the client 200 according to the install execution state of the client 200, returned to the server 100 before reboot, downloaded again into the client 200 after reboot, and then updated in the client 200 according to the install execution state of the client 200. With this arrangement, the updated managing record file 10 is once returned to the server 100 before reboot and downloaded again into the client 200 after reboot, so that the agent 12 refers to it to continue the installation according to a continuation of the execution script S which is to be executed after reboot.

Figure 6:
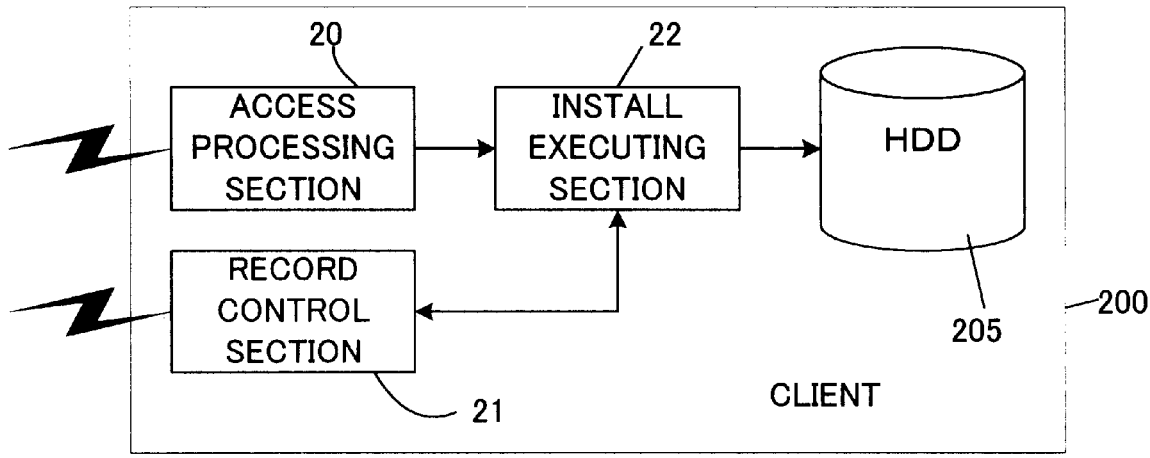
FIG. 6 is a functional block diagram of the client.

FIG. 6 shows the client 200 in the form of functional blocks.

The client 200 comprises an access processing section 20 for accessing the execution script S, a record control section 21 for causing the install execution state to be recorded into the managing record file 10, and an install executing section 22 for executing installation based on the recorded install execution state and the execution script S.

With this arrangement, the access processing section 20 accesses the execution script S, and the install executing section 22 installs the install file 13 according to the execution script S and the install execution state recorded in the managing record file 10. Then, depending on the execution of the installation, the record in the managing record file 10 is updated by the record control section 21. Since the record in the managing record file 10 is updated by the record control section 21 and since the install executing section 22 executes installation according to the record in the managing record file 10, even if there exists such a program requiring a reboot in the install file 13, the installation can be continued after the reboot. Thus, it is possible to access the server 100 and automatically install such an install file 13 into the client 200.

Figure 7:
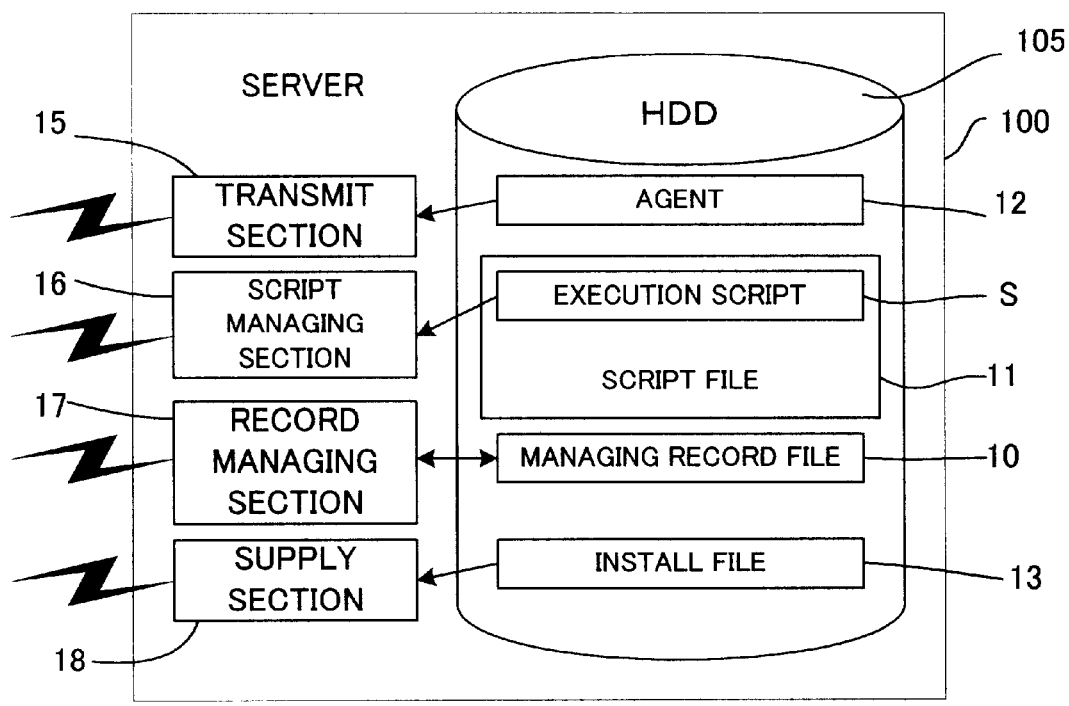
FIG. 7 is a functional block diagram of the server.
Figure 4:
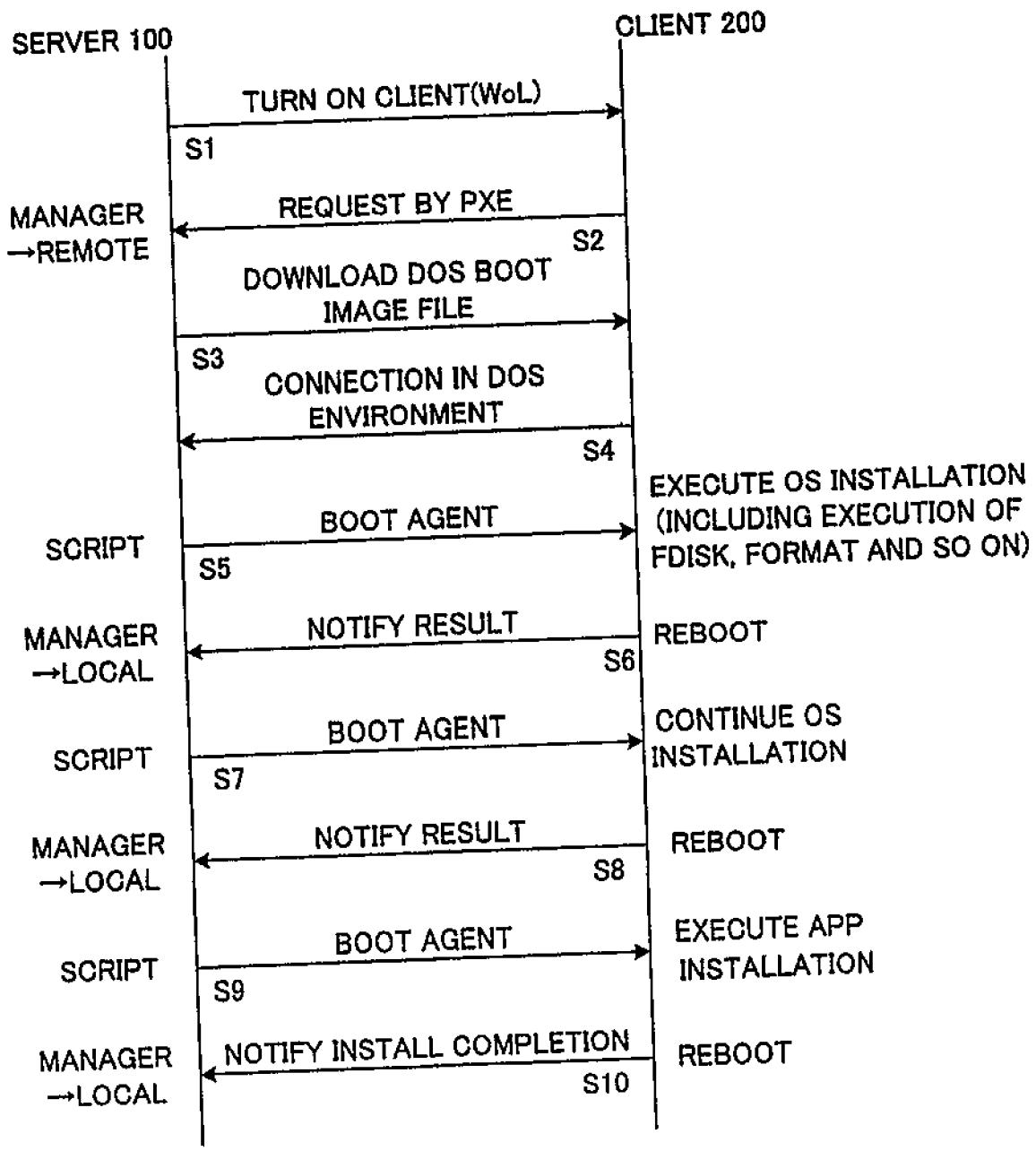

FIG. 7 shows the server 100 in the form of functional blocks.

The server 100 comprises a transmit section 15 for transmitting the agent 12 to the client 200, a script managing section 16 for allowing the agent 12 to refer to the execution script S (managing reading of the script file 11) in response to an access from the agent 12, a record managing section 17 for notifying the install execution state of the client 200 and updating the record of the install execution state of the client 200 (managing reading and updating of the managing record file 10) in response to an access from the agent 12, and a supply section 18 for supplying the install file 13 requested by the agent 12 to the client 200.

With this arrangement, the transmit section 15 sends the agent 12 to the client 200, and the supply section 18 sends the install file 13 to the agent 12 in response to a request from the agent 12 functioning in the client 200, so that the agent 12 refers to the execution script S managed by the script managing section 16 and the install execution state recorded by the record managing section 17 thereby to install the install file 13 into the client 200. In this case, since the record managing section 17 updates the record of the install execution state according to the install execution state and since the agent 12 implements the installation by referring to the record, even if there exists such a program requiring a reboot in the install file 13, the agent 12 can continue the installation after the reboot.

The client 200 may be realized by loading into a computer a recording medium, such as a CD-ROM, recording a particular program.

Specifically, when the program is loaded into the computer, the computer executes a step of referring to the execution script S, a step of recording the install execution state, and a step of requesting a supply of the install file 13 relative to the server 100 and executing installation of the install file 13 based on the execution script S and the install execution state.

With this arrangement, the agent 12 functions by causing the computer to read and execute the program recorded in the recording medium. By referring to the execution script S and the install execution state, the agent 12 requests a supply of the install file 13 to the server 100 and executes installation of the supplied install file 13. In this event, since the agent 12 causes the record of the install execution state to be updated and executes the installation by referring to it, even if there exists such a program requiring a reboot in the install file 13, the agent 12 can continue the installation after the reboot.

Similarly, the server 100 may be realized by loading into a computer a recording medium, such as a CD-ROM, recording a particular program.

Specifically, when the program is loaded into the computer, the computer executes a step of transmitting to the client 200 the agent 12 which executes program installation, a step of allowing the agent 12 to refer to the execution script S in response to an access from the agent 12, a step of notifying the install execution state of the client 200 and updating the record of the install execution state of the client 200 in response to an access from the agent 12, and a step of supplying the install file 13 requested by the agent 12 to the client 200.

With this arrangement, the computer functions as the server 100 by causing the computer to read and execute the program recorded in the recording medium. In this case, the computer sends the agent 12 to the client 200, sends the install file 13 to the agent 12 in response to a request from the agent 12 functioning in the client 200, and causes the agent 12 to refer to the execution script S and the record of the install execution state thereby to execute installation of the install file 13 in the client 200. In this event, since the agent 12 causes the record of the install execution state to be updated and executes the installation by referring to it, even if there exists such a program requiring a reboot in the install file 13, the agent 12 can continue the installation after the reboot.

While the present invention has been described in terms of the preferred embodiment, the invention is not to be limited thereto, but can be embodied in various ways without departing from the principle of the invention as defined in the appended claims.

What is claimed is:

1. A remote loading execution method, wherein an agent executes installation into a client by referring to a managing record recording an install execution state of the client and according to execution control information, said agent downloaded into the client from a server before starting the installation and downloaded again into the client from the server after an occurrence of a reboot of said client, and wherein said managing record is updated according to an execution progressing state of the installation upon occurrence of a request for the reboot of said client, so that the agent downloaded again into the client from the server can continue the installation by referring to the updated managing record even after the reboot is performed.

2. The remote loading execution method according to claim 1, wherein the client is set to boot by itself upon the reboot.

3. A remote loading execution method, wherein, upon installing a program requiring a reboot from a server into a client, an agent downloaded into the client executes installation of the program by referring to a managing record recording an install execution state of the client and according to execution control information and updates said managing record according to an execution progressing state of the installation, and wherein the agent downloaded again into the client after the reboot continues the installation by referring to said managing record and according to said execution control information and updates said managing record according to an execution progressing state of the installation after the reboot.

4. The remote loading execution method according to claim 3, wherein said execution control information is provided in the server.

5. The remote loading execution method according to claim 3, wherein said execution control information is downloaded into the client before starting the installation or after the reboot.

6. The remote loading execution method according to claim 3, wherein said managing record is provided in the server.

7. The remote loading execution method according to claim 3, wherein said managing record is downloaded from the server into the client and updated according to an execution progressing state of the installation into the client, and wherein said managing record is returned to the server before the reboot, downloaded again into the client after the reboot and updated according to an execution progressing state of the installation into the client after the reboot.

8. The remote loading execution method according to claim 3, wherein the client is set to boot by itself upon the reboot.

9. A remote loading execution system comprising:
a server having a managing record file for recording an install execution progressing state of a client, a control file for storing execution control information prescribing an execution process of installation into the client, an agent which executes installation into the client according to the execution control information stored in said control file, and an install file to be installed into the client by said agent; and
the client into which said agent is downloaded,
wherein said agent is downloaded from the server into the client before installation, executes installation of the install file into the client by referring to said managing record file and according to said execution control information, updates said managing record file according to an execution progressing state of the installation into the client and, when downloaded again into the client after a reboot, continues the installation of the install file by referring to said managing record file and according to said execution control information, and updates said managing record file according to an execution progressing state of the installation after the reboot.

10. The remote loading execution system according to claim 9, wherein said control file is provided in the server.

11. The remote loading execution system according to claim 9, wherein said control file is downloaded into the client before starting the installation or after the reboot.

12. The remote loading execution system according to claim 9, wherein said managing record file is downloaded from the server into the client and updated according to an execution progressing state of the installation into the client, and wherein said managing record file is returned to the server before the reboot, downloaded again into the client after the reboot, and updated according to an execution progressing state of the installation into the client after the reboot.

13. The remote loading execution system according to claim 9, wherein the client is set to boot by itself upon the reboot.

14. A data processing apparatus which accesses another apparatus managing a program thereby to install said program thereinto, said data processing apparatus and said another apparatus managing a program being related as client and server, respectively, and said data processing apparatus comprising:
an access processing section accessing execution control information prescribing an install execution procedure;
a record control section causing a record of an execution progressing state of installation into the data processing apparatus to be updated upon occurrence of a request for a reboot of said data processing apparatus; and
an install executing section executing installation into said data processing apparatus according to the updated record of the execution progressing state of the installation and the execution control information, so that said install executing section can continue the installation by referring to the updated record of the execution progressing state of the installation even after the reboot is performed.

15. A managing apparatus which manages a program and supplies said program in response to a request from another apparatus, said managing apparatus and said another apparatus being related as server and client, respectively, and said managing apparatus comprising:

a transmit section transmitting to said another apparatus an agent which executes installation into said another apparatus;

a control information managing section allowing said agent to refer to execution control information prescribing an install execution process in response to an access from said agent;

a record managing section allowing said agent to refer to an execution progressing state of installation into said another apparatus in response to an access from said agent, said record managing section updating a record of the execution progressing state of the installation in response to a request sent from said agent upon occurrence of a request for a reboot of said another apparatus, so that said agent can continue the installation by referring to the updated record of the execution progressing state of the installation even after the reboot of said another apparatus is performed; and a supply section for supplying to said another apparatus the program in response to a request from said agent.

16. A computer-readable recording medium storing a program which causes a computer, functioning as a client in relation to a server, to execute:

a step of referring to execution control information from the server prescribing an install execution process;

a step of causing a record of an execution progressing state of installation into said computer to be updated from the server upon occurrence of a request for a reboot of said computer; and a step of requesting from the server a supply of a program to be installed in the client and executing installation thereof according to said execution control information and said updated record of the execution progressing state.

17. A computer-readable recording medium storing a program which causes a computer, functioning as a server in relation to a client, to execute:

a step of sending to another apparatus, functioning as the client, an agent which executes installation into said another apparatus;

a step of allowing said agent to refer to execution control information in response to an access from said agent;

a step of allowing said agent to refer to an execution progressing state of installation into said another apparatus in response to an access from said agent and updating a record of the execution progressing state of the installation in response to a request sent from said agent upon occurrence of a request for a reboot of said another apparatus, so that said agent can continue the installation by referring to the updated record of the execution progressing state of the installation even after the reboot of said another apparatus is performed; and a step of supplying to said another apparatus a program requested by said agent.

18. A computer-readable recording medium storing a program which causes a computer, functioning as a server in relation to a client, to execute a remote loading execution function without operator assist, by:

sending to another apparatus, functioning as the client, an agent which executes installation into said another apparatus;

allowing said agent to refer to execution control information in response to an access from said agent;

allowing said agent to refer to an execution progressing state of installation into said another apparatus in response to an access from said agent and updating a record of the execution progressing state of the installation in response to a request sent from said agent upon occurrence of a request for a reboot of said another apparatus, so that said agent can continue the installation by referring to the updated record of the execution progressing state of the installation even after the reboot of said another apparatus is performed; and supplying to said another apparatus a program requested by said agent.

* * * * *

UNITED STATES PATENT AND TRADEMARK OFFICE
CERTIFICATE OF CORRECTION

| | | |
|---|---|---|
| PATENT NO. | : 6,816,964 B1 | Page 1 of 1 |
| APPLICATION NO. | : 09/523680 | |
| DATED | : November 9, 2004 | |
| INVENTOR(S) | : Masanori Suzuki et al. | |

It is certified that error appears in the above-identified patent and that said Letters Patent is hereby corrected as shown below:

On the Title page
(56) References Cited insert --6,438,749    B1 8/2002    Chamberlain    717/174--

FIG. 4 change "EXECUTE APP INSTAAATION" to --EXECUTE APP INSTALLATION--.
(see attached)

Signed and Sealed this

Fifth Day of December, 2006

JON W. DUDAS
*Director of the United States Patent and Trademark Office*